United States Patent
Nonaka et al.

(10) Patent No.: US 8,710,750 B2
(45) Date of Patent: Apr. 29, 2014

(54) LIGHT SOURCE LIGHTING DEVICE INCLUDING A CONSTANT-CURRENT SUPPLY THAT IS CONNECTED TO A LIGHT SOURCE AND SUPPLIES A CONSTANT CURRENT OF A SUBSTANTIALLY CONSTANT MAGNITUDE TO THE LIGHT SOURCE, AND LUMINAIRE

(75) Inventors: Takafumi Nonaka, Tokyo (JP); Takashi Kumagai, Tokyo (JP); Yuichiro Ito, Tokyo (JP); Haruka Kinoshita, Tokyo (JP); Shinsuke Funayama, Kanagawa-ken (JP); Takashi Maeda, Kanagawa-ken (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 245 days.

(21) Appl. No.: 13/274,617

(22) Filed: Oct. 17, 2011

(65) Prior Publication Data

US 2012/0187863 A1    Jul. 26, 2012

(30) Foreign Application Priority Data

Jan. 21, 2011  (JP) .................................. 2011-011342

(51) Int. Cl.
*H05B 39/00*    (2006.01)
(52) U.S. Cl.
USPC ........ 315/185 S; 315/291; 315/247; 315/307; 315/312
(58) Field of Classification Search
USPC ............... 315/247, 224, 185 S, 291, 307–326
See application file for complete search history.

(56) References Cited

U.S. PATENT DOCUMENTS

| | | | | |
|---|---|---|---|---|
| 5,039,921 A | * | 8/1991 | Kakitani | 315/307 |
| 5,600,211 A | * | 2/1997 | Luger | 315/307 |
| 5,973,455 A | * | 10/1999 | Mirskiy et al. | 315/105 |
| 6,501,235 B2 | * | 12/2002 | Ortmeyer | 315/307 |

(Continued)

FOREIGN PATENT DOCUMENTS

| | | |
|---|---|---|
| EP | 1 517 588 A1 | 3/2005 |
| JP | 62-71194 A | 4/1987 |

(Continued)

OTHER PUBLICATIONS

Office Action dated Dec. 25, 2012, issued in corresponding Japanese Patent Application No. 2011-011342, and an English Translation thereof. (6 pages).

*Primary Examiner* — Tuyet Thi Vo
(74) *Attorney, Agent, or Firm* — Buchanan Ingersoll & Rooney PC

(57) ABSTRACT

A power supply circuit drives circuits having different numbers of series-connected LEDs without changing a circuit constant or a component. An LED series circuit is connected to a power converter circuit of a power supply circuit. The power converter circuit is controlled by a control arithmetic circuit, and supplies a constant current to the LED series circuit. A voltage detection circuit detects a voltage applied to the LED series circuit. The control arithmetic circuit checks whether the LED series circuit has 40 LEDs or 20 LEDs, based on the voltage detected by the voltage detection circuit. The control arithmetic circuit holds a constant-current value table for 40 LEDs and a constant-current value table for 20 LEDs. In accordance with the detected voltage, the control arithmetic circuit selects one constant-current value table, and controls the power converter circuit based on the constant-current value table selected.

7 Claims, 7 Drawing Sheets

(56) References Cited

U.S. PATENT DOCUMENTS

| | | |
|---|---|---|
| 7,259,522 B2 | 8/2007 | Toyota et al. |
| 7,589,472 B2 * | 9/2009 | Keith et al. ............... 315/94 |
| 7,728,808 B2 | 6/2010 | Kim |
| 7,952,295 B2 | 5/2011 | Otake et al. |
| 2004/0090189 A1 | 5/2004 | Yoneda et al. |
| 2005/0062445 A1 | 3/2005 | Toyota et al. |
| 2005/0116921 A1 | 6/2005 | Kim |
| 2008/0297062 A1 | 12/2008 | Otake et al. |
| 2010/0219768 A1 | 9/2010 | Takaki et al. |

FOREIGN PATENT DOCUMENTS

| | | |
|---|---|---|
| JP | 63-056469 A | 3/1988 |
| JP | 08-055684 A | 2/1996 |
| JP | 11-027655 A | 1/1999 |
| JP | 2004-158840 A | 6/2004 |
| JP | 2004-178945 A | 6/2004 |
| JP | 2005-093196 A | 4/2005 |
| JP | 2005-157387 A | 6/2005 |
| JP | 2006-054362 A | 2/2006 |
| JP | 2007-037569 A | 2/2007 |
| JP | 2007-044073 A | 2/2007 |
| JP | 2007-096113 A | 4/2007 |
| JP | 2008-300208 A | 12/2008 |
| JP | 2008-305581 A | 12/2008 |
| JP | 2009-080983 A | 4/2009 |
| JP | 2009-283281 A | 12/2009 |
| JP | 2010-015887 A | 1/2010 |
| JP | 2010-113924 A | 5/2010 |
| JP | 2010-205453 A | 9/2010 |
| JP | 2011-023440 A | 2/2011 |

* cited by examiner

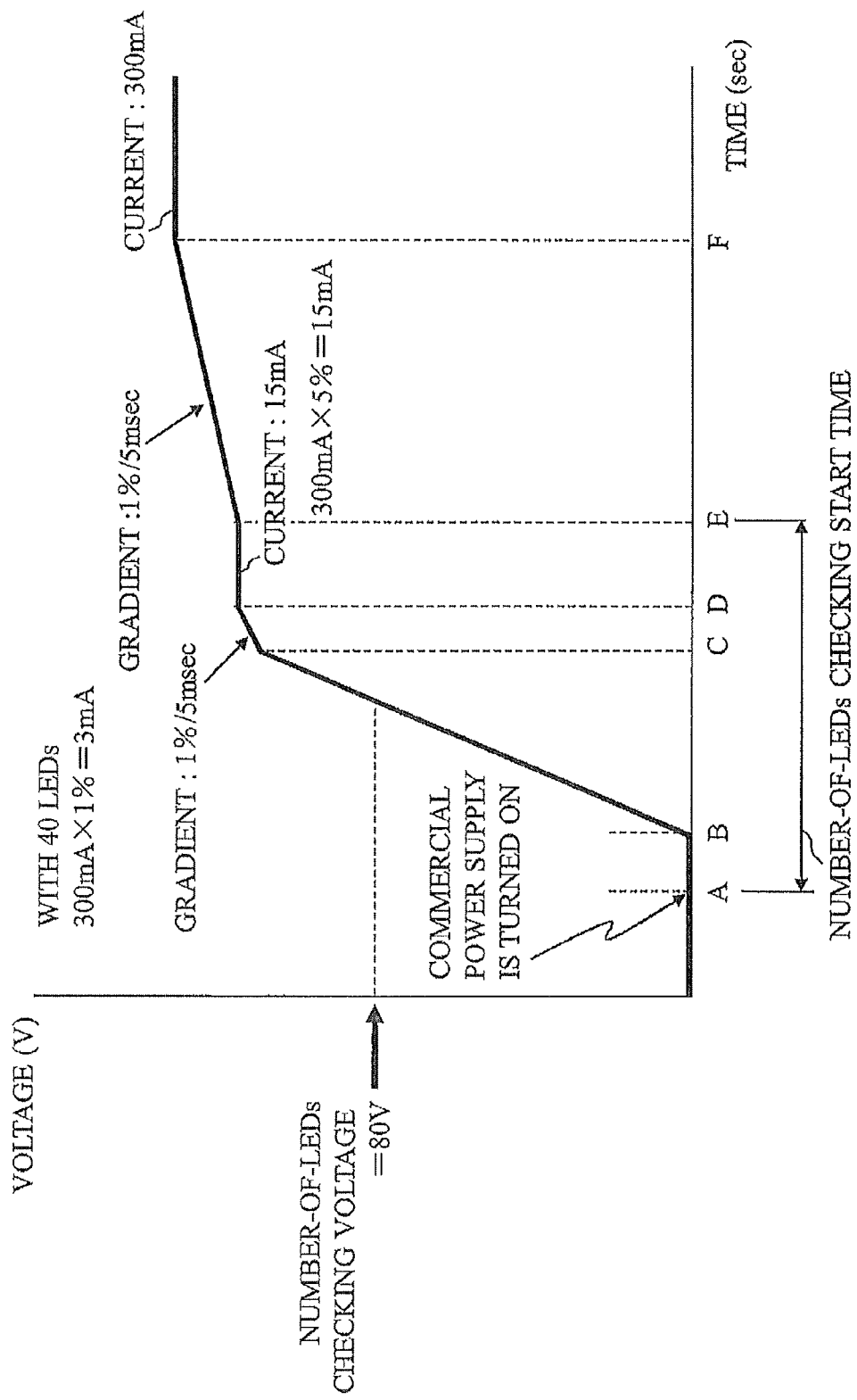

LIGHT SOURCE LIGHTING DEVICE INCLUDING A CONSTANT-CURRENT SUPPLY THAT IS CONNECTED TO A LIGHT SOURCE AND SUPPLIES A CONSTANT CURRENT OF A SUBSTANTIALLY CONSTANT MAGNITUDE TO THE LIGHT SOURCE, AND LUMINAIRE

CROSS-REFERENCE TO RELATED APPLICATIONS

This application is based on and claims the benefit of priority from Japanese Patent Application No. 2011-011342, filed in Japan on Jan. 21, 2011, the content of which is incorporated herein by reference in its entirety.

TECHNICAL FIELD

The present invention relates to a light source lighting device which lights a light source, and a luminaire provided with the light source lighting device.

BACKGROUND ART

As a power supply circuit which converts electric power supplied from an AC power supply such as a commercial power supply into a DC for lighting a light-emitting element such as a light-emitting diode (to be referred to as an "LED" hereinafter) or an organic electroluminescence (to be referred to as an "organic EL" hereinafter), a combination of a power factor correction circuit and a power converter circuit is known. The power factor correction circuit is a circuit that approximates the input power factor to 1 so that the power supply distortion of the commercial power supply and the like is suppressed. As the power factor correction circuit, for example, a voltage booster circuit is employed. The power converter circuit is a constant-current drive circuit that operates to maintain a current flowing in a light-emitting element at a predetermined target value by adjusting the voltage to be applied to the light-emitting element. As the power converter circuit, for example, a system using a fly-back converter circuit, a DC/DC converter circuit, or a half-bridge circuit is employed. Usually, a load voltage which drives a light-emitting element such as an LED or organic EL is lower than an output voltage outputted by the power factor correction circuit. Hence, as the power converter circuit, a voltage-dropping type circuit that outputs a voltage lower than the input voltage is employed. Various types of power supply voltages are used as the power supply voltage of the commercial power supply. The power supply circuit, therefore, is desirably capable of coping with an AC power supply of a wide voltage range (for example, patent literatures 1 and 2).

The power supply circuit of a luminaire that consumes a certain degree of power or over is required to perform harmonic component regulation and to have a high power factor, and is accordingly formed by combining a power factor correction circuit and a power converter circuit. A forward voltage generated across the two ends of an LED when a current is supplied to the LED changes depending on variations in the manufacture, the ambient temperature, heat generation by the loss of the LED, and the amount of current supplied. Considering such variations and temperature change, to obtain a desired light-emitting output stably from a luminaire which uses an LED, it is desired to drive the LED with a constant current.

The difference between the present invention and patent literatures 3 to 13 associated to the present invention will be described hereinafter.

(1) Patent literature 3 discloses a lighting method with which power supply devices of the same specification can light lighting heads connected to the power supply devices with the rated current in accordance with the specifications of the individual lighting heads.

According to the lighting method of patent literature 3, the lighting head must incorporate a discrimination circuit, and the power supply device requires two Current control circuits, e.g., a current detection resistor and a detection resistor. Regarding this, according to the present invention, the LED series circuit need not incorporate a resistor that discriminates the specification of the element, and the power supply circuit requires only one current control circuit.

(2) Patent literature 4 discloses, in the backlight of a liquid-crystal display device, a method which drives a light-emitting diode under an optimum condition that provides a uniform brightness and chromaticity even when the drive currents for the light-emitting diodes vary.

In patent literature 4, the drive voltage is applied to the light-emitting diode from an LCD drive circuit. In contrast to this, in the present invention, since constant-current control is performed, even when the characteristics of the light-emitting elements vary, the light-emitting elements can be driven with a constant target current value. In patent literature 4, the drive condition for the light-emitting diode which is stored in advance is read in response to an external control signal. According to the present invention, the light-emitting element connected is discriminated automatically when the power supply is turned on.

(3) Patent literature 5 discloses, in an optical adapter for an endoscope device, a method of downsizing an endoscope insertion part by reducing the number of signal lines employed for checking the attached/detached state, checking the type of the optical adapter, and driving an LED.

In patent literature 5, a plurality of power supplies are prepared for the endoscope main body which are employed for checking of the attached/detached state, lighting the LED, and driving the LED. In contrast to this, the present invention requires only one power supply circuit. In patent literature 5, the signal lines from the optical adapter are switched by a switching circuit, whereas in the present invention, the line that connects a light-emitting element and the power supply circuit need not be switched. The optical adapter of patent literature 5 requires a type checking resistor, while the light-emitting element of the present invention does not require such a type checking resistor.

(4) Patent literature 6 discloses, in an endoscope device, a method capable of checking an optical adapter mounted, driving an LED in the optical adapter in a suitable manner for the structure of the LED, and reducing the diameter of an endoscope insertion part.

In patent literature 6, the types of a plurality of optical adapters having LEDs of different structures are checked using checking resistors in the optical adapters. In contrast to this, according to the present invention, the type of light source is checked by reading the load voltage output from the constant-current drive circuit. In the endoscope device of patent literature 6, a plurality of power supply circuits are used by switching, whereas the luminaire of the present invention incorporates only one power supply circuit.

(5) Patent literature 7 discloses, in an LED light source device provided with an LED light source part having light-emitting diodes which emit light of at least one emission color (for example, RGB emission), a method of maintaining the white balance by performing drive control based on prestored specific information on the LEDs.

In patent literature 7, a storage device stores the specific information on the LEDs in order to maintain the white balance of an LED drive circuit for light of at least one emission color. In contrast to this, according to the present invention, for example, in a light-emitting element using a white LED for lighting, information such as threshold values for checking the number of LEDs and drive current values are stored in a microcomputer. According to patent literature 7, white color is generated by mixing a plurality of emission colors, and the white balance of the white color is controlled. Unlike such patent literature 7, the present invention relates to a power supply circuit capable of driving a plurality of light-emitting elements with different constant-current values.

(6) Patent literature 8 discloses an LED lighting control circuit which controls an LED drive current to cope with fluctuations in VF (forward voltage) of the LED such that the output power falls within a predetermined range; and a vehicle lighting fitting.

According to patent literature 8, control is performed to suppress a change in output power by changing the value of the drive current in accordance with the value of the VF of the LED. In contrast to this, the present invention performs constant-current control, and the LED is driven by a target current value regardless of the value of the VF of the LED. The light emission output (brightness) of an LED roughly depends on the current value. Accordingly, a luminaire that requires a prescribed illuminance is driven by constant-current drive regardless of the VF, so that the brightness is maintained. The constant-current circuit is designed to be capable of driving even when the VF is high. Hence, according to the present invention, when the VF of the LED is high, the output power is high; when the VF is low, the output power is low.

(7) Patent literature 9 discloses, in an LED lighting device such as a guide light or an emergency light, a method of avoiding erroneous operation of a safety circuit without changing the threshold value of the safety circuit even when an LED light source unit is exchanged.

In patent literature 9, since a diode is connected as a voltage adjusting element to the LED light source part, the power supply efficiency decreases. The present invention does not use a voltage adjusting element, so the power supply efficiency does not decrease. In patent literature 9, the voltages of a predetermined number of LEDs are monitored. In the case of an LED short-circuiting fault, when the voltage of the LED drops to less than a threshold value, power supply to the LED light source part is stopped. In contrast to this, according to the present invention, the LED light source part is kept ON even when the light-emitting element causes a partial short-circuiting fault. Power supply is stopped when an open fault occurs. In patent literature 9, the LED power supply part has a voltage dividing resistor. With the voltage dividing resistor, the LED power supply part is discriminated, and a lighting current corresponding to the discriminated LED power supply part is acquired. In contrast to this, according to the present invention, a low current is supplied to the light-emitting element, and the load voltage value at this time is measured, thus checking the type of the light-emitting element (the number of LEDs).

(8) Patent literature 10 discloses a cross-fade type lighting control device (dimmer) in which, when lighting is to change from the current lighting to the next lighting on a stage or in a television studio, the change takes place automatically and smoothly.

Patent literature 10 relates to a lighting control device and a method of carrying out cross-fade control that realizes smooth lighting change to the next scene. In contrast to this, fade shift control of the present invention is a method relating to lighting, putting out, and lighting control (dimming) of a luminaire.

(9) Patent literature 11 discloses, in a color video door-phone device, a method that gradually increases the brightness of a night lighting LED regardless of the length of the transmission path.

In patent literature 11, the current to be supplied to the LED is gradually increased using two circuits, i.e., a current control circuit and a constant-current circuit. In contrast to this, according to the present invention, using the constant-current value table of the microcomputer, the target current value is gradually changed, so that the current flowing through the light-emitting element is smoothly changed by a single constant-current circuit.

(10) Patent literature 12 discloses a method in a portable telephone, which gradually increases the brightness of a plurality of LEDs from an OFF state at desired timings.

In patent literature 12, a predetermined-current supply circuit and a variable-current supply circuit are used in order to fade-in from an OFF state and fade-out the plurality of LEDs simultaneously. With a predetermined drive current being supplied, a variable current is further added, thus performing lighting control. In contrast to this, according to the present invention, constant-current control using a constant-current value table is conducted, so that fade-in and fade-out are performed with a single power supply circuit.

(11) Patent literature 13 discloses a lighting control (dimming) method in a stage-use lighting controller (dimmer) provided with a signal reception-side lighting means which anticipates a time period that will lapse before next signal reception and performs lighting control to reach the anticipated target value stepwise within the anticipated time period.

According to patent literature 13, the signal is updated only slowly with a maximum update period of 1 sec due to the standard of the lighting control (dimming) signal. This speed cannot catch up with the lighting response speed of the LED. Hence, flickering is eliminated by anticipating the value of the next lighting control signal. In contrast to this, the present invention uses a lighting controller which is usually employed in a luminaire. The lighting control signal of the lighting controller has a frequency of about 100 Hz to 1 kHz. With this frequency, flickering to the human eye caused by the lighting control signal update period will not occur easily. According to the present invention, even when the lighting control signal changes sharply, the target current value is not changed at a rate exceeding a predetermined rate. This function is realized by conducting control that delays the change using the microcomputer, instead of anticipating the next lighting control signal value as in patent literature 13.

CITATION LIST

Patent Literature

| [Patent Literature 1] | JP 2009-80983 |
| [Patent Literature 2] | JP 2010-113924 |
| [Patent Literature 3] | JP 2005-093196 |
| [Patent Literature 4] | JP 2005-157387 |
| [Patent Literature 5] | JP 2007-037569 |
| [Patent Literature 6] | JP 2007-044073 |
| [Patent Literature 7] | JP 2007-096113 |
| [Patent Literature 8] | JP 2010-015887 |
| [Patent Literature 9] | JP 2010-205453 |

-continued

| [Patent Literature 10] | JP 62-071194 |
| [Patent Literature 11] | JP 11-027655 |
| [Patent Literature 12] | JP 2006-054362 |
| [Patent Literature 13] | JP 2008-305581 |

SUMMARY OF INVENTION

Technical Problem

A power supply circuit for performing constant-current drive has a resistance value, a reference voltage, and the like designed to always supply a constant current to a light-emitting element (an LED, an organic EL, and the like) connected to the power supply circuit, in order that a desired light-emission output is obtained constantly. Assume that a different light-emission output is required of the light-emitting element, or even if the desired light-emission output is the same, the constant-current value to be supplied to the LED is different. In these cases, another power supply circuits must be re-designed. Hence, it is impossible to use one power supply circuit as a drive circuit for a light-emitting element that requires a different constant-current value.

Since the power supply circuit for constant-current drive is designed to match the light-emitting element to be connected to the power supply circuit, the power supply circuit cannot be used for another light-emitting element that requires a different constant-current value.

It is an object of the present invention to enable a single power supply circuit to automatically check light-emitting elements (LED series circuits each formed of a plurality of LEDs connected in series) which are used with different constant-current values, and to drive the respective light-emitting elements with the constant-current values required by them.

Solution to Problem

A light source lighting device of the invention includes:

a constant-current supply part connected to a light source and subjected to drive control in order to supply a constant current of a substantially constant magnitude which matches the drive control, to the light source;

a light source application voltage detection part that detects a light source application voltage which is a voltage to be applied to the light source; and a control part that checks a light source type of the light source connected to the constant-current supply part, based on the light source application voltage detected by the light source application voltage detection part, selects, from among drive information which describe constant-current value information corresponding to constant-current values to be supplied to the light source and which are held in advance for respective light source types, the drive information on the light source type indicated by a checking result of the light source type, and drive-controls the constant-current supply part based on the constant-current value information described on the drive information selected.

Advantageous Effects of Invention

According to the power supply circuit of the present invention, light-emitting elements (LED series circuits each formed of a plurality of LEDs connected in series) which require different constant-current values can be driven by a single power supply circuit with constant-current values that match the numbers of LEDs of the respective light-emitting elements.

BRIEF DESCRIPTION OF DRAWINGS

The present invention will become fully understood from the detailed description given hereinafter in conjunction with the accompanying drawings, in which:

FIG. 7 is a graph showing the relation between the LED voltage after the power supply is turned on, and the target voltage.

DESCRIPTION OF EMBODIMENTS

Figure 1:
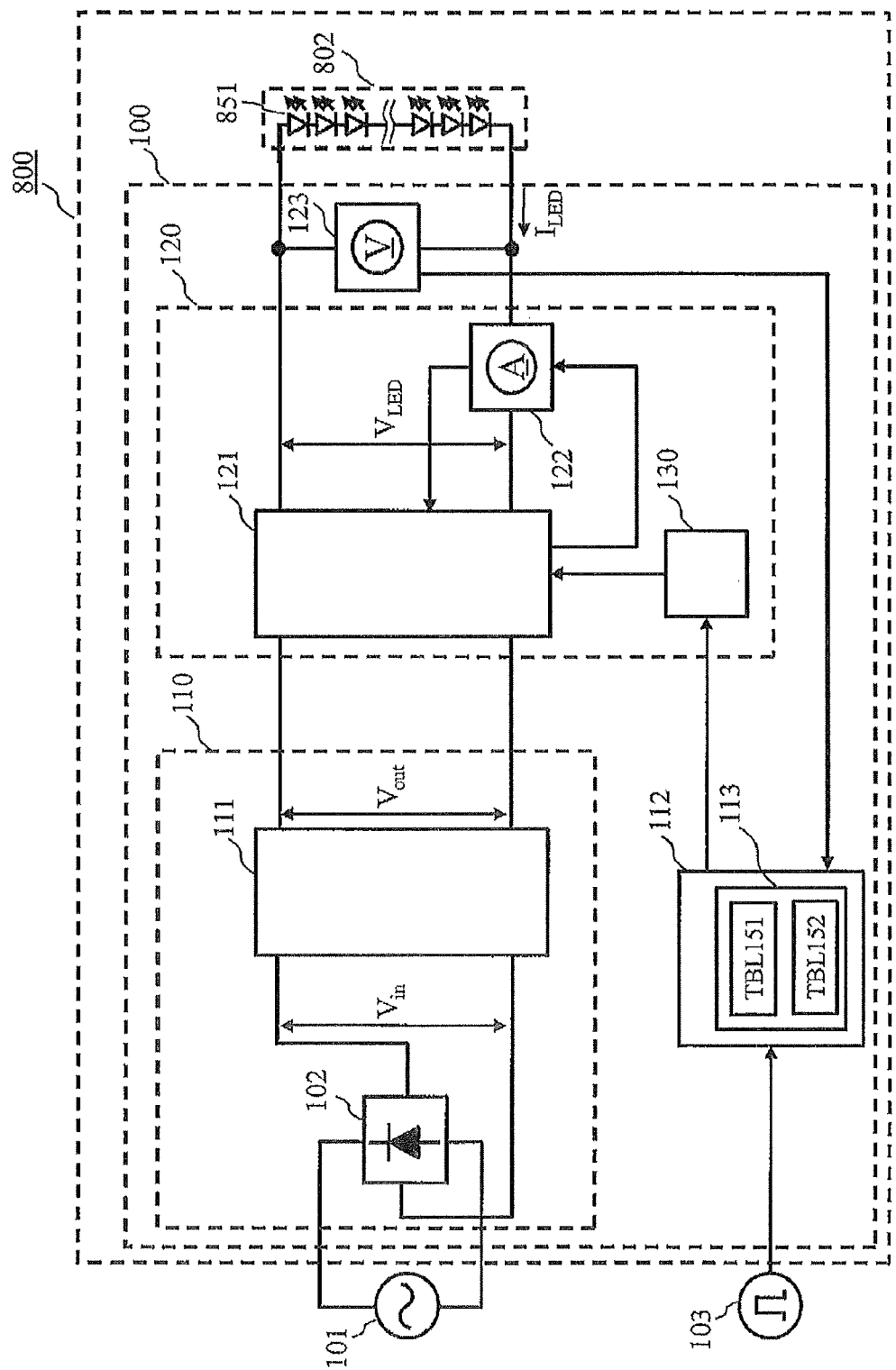
FIG. 1 is a bock diagram of a luminaire 800 of the first embodiment.

In describing preferred embodiments illustrated in the drawings, specific terminology is employed for the sake of clarity. However, the disclosure of the present invention is not intended to be limited to the specific terminology so selected, and it is to be understood that each specific element includes all technical equivalents that operate in a similar manner and achieve a similar result.

Embodiment 1

A power supply circuit 100 (light source lighting device) of the first embodiment will be described with reference to FIGS. 1 to 7.

(Configuration of Luminaire 800)

FIG. 1 is a block diagram of a luminaire 800 provided with the power supply circuit 100. After reception of AC power from a commercial power supply 101, the luminaire 800 lights a light-emitting element such as an LED or organic EL. The luminaire 800 incorporates the power supply circuit 100 and a light-emitting element 802.

(Light-Emitting Element 802)

(1. Definition of Light-Emitting Element)

The "light-emitting element 802" (light source) used in the first embodiment refers to an LED module formed of an LED series circuit 851 in which a plurality of LEDs are connected in series, as shown as the light-emitting element 802 in FIG. 1 (described later). For example, the light-emitting element 802 is an LED series circuit 851 composed of 40 LEDs connected in series. The light-emitting element 802 is connected to a power converter circuit 120.

(2. Two Types of Light-Emitting Elements 802)

Note that the light-emitting element 802 that can be connected to the power converter circuit 120 is available in at least two types. The number of LEDs connected in series in the light-emitting element 802 as well as the constant-current value necessary for driving the light-emitting element 802 differ depending on the type of the light-emitting element 802. In the first embodiment, two types of light-emitting elements 802 are considered, i.e., a light-emitting element 802 in which 40 LEDs are connected in series, and a light-emitting element 802 in which 20 LEDs are connected in series. The type (light source type) referred to in the first embodiment means the distinction as to whether the light-emitting element 802 is an LED module formed of 40 LEDs connected in series, or an LED module formed of 20 LEDs connected in series. When distinction is required, the light-emitting element in which 40 LEDs are connected will be expressed as an LED series circuit 851 (40), and the LED series circuit in which 20 LEDs are connected will be expressed as an LED series circuit 851 (20). The light-emitting element 802 (the LED series circuit 851) is lit to emit light with a desired brightness when it is constant-current driven with a target current value determined by the power supply circuit 100 and a lighting controller (dimmer) 103.

(Characteristic Feature of Power Supply Circuit 100)

The characteristic feature of the power supply circuit 100 is as follows. As shown in FIG. 1, the power supply circuit 100 includes a power factor correction circuit 110, a power converter circuit 120 (constant-current supply part), a voltage detection circuit 123 (detection part for a voltage applied to the light source), a control arithmetic circuit 112 (control part), and the like. In FIG. 1, the light-emitting element 802 is connected to the power converter circuit 120. When the power converter circuit 120 is drive-controlled by the control arithmetic circuit 112, the power converter circuit 120 supplies a constant current of a substantially constant magnitude corresponding to the drive control, to the light-emitting element 802. The voltage detection circuit 123 detects the voltage (a light source application voltage) applied to the light-emitting element 802. The control arithmetic circuit 112 has constant-current value tables 151 and 152 (drive information) corresponding to the light-emitting elements 802 connected to the power converter circuit 120, for the respective light-emitting elements 802. Each constant-current value table describes information on the constant current to be supplied to the light-emitting element 802. Based on the light source application voltage which is detected by the voltage detection circuit 123, the control arithmetic circuit 112 checks the type of the light source of the light-emitting element 802 connected to the power converter circuit 120. Note that in the first embodiment, the light source type means the distinction as to whether the light-emitting element 802 is the LED series circuit 851 (40) formed of 40 light-emitting elements, or the LED series circuit 851 (20) formed of 20 light-emitting elements. The control arithmetic circuit 112 selects a constant-current value table (either the constant-current value table 151 or 152 in the case of FIG. 1) of the light source type indicated by the checking result of the light source type, and drive-controls the power converter circuit 120 based on the selected constant-current value table. The power supply circuit 100 can light the light-emitting element 802 by constant-current control, in accordance with the type of the light-emitting element 802 connected.

The power supply circuit 100 converts the AC inputted from the commercial power supply 101 into a DC to be supplied to the light-emitting element 802. The light-emitting element 802 is lit by the DC obtained by conversion of the power supply circuit 100. The lighting controller 103 sends a lighting control (dimming) signal to adjust the light-emission output of the light-emitting element 802, to the power supply circuit 100.

(Power Factor Correction Circuit 110)

A power factor correction circuit 110 has a rectifier circuit 102 and a voltage booster circuit 111. The rectifier circuit 102 inputs an AC (e.g., a 50-Hz to 60-Hz single-phase AC having an effective voltage of 85 V to 265 V) from the commercial power supply 101, and generates a pulsating current by rectifying the AC inputted. The power factor correction circuit 110 inputs the pulsating current generated by the rectifier circuit 102, and generates a DC voltage by boosting the pulsating current inputted. The power factor correction circuit 110 also controls the input current so as to have a waveshape similar to that of the voltage of the pulsating current inputted, thus improving the power factor of the input.

(Power Converter Circuit 120)

The power converter circuit 120 has a voltage dropping circuit 121, a current detection circuit 122, and an integration circuit 130. The power converter circuit 120 inputs the DC generated by the power factor correction circuit 110, and voltage-drops the DC inputted, to generate the DC to be applied to the light-emitting element 802. The power converter circuit 120 detects the current flowing through the light-emitting element 802 by the current detection circuit 122, and adjusts (by feedback control) the voltage value of the DC to be generated, such that the detected current value coincides with a predetermined target current value. With this operation, the power supply circuit 100 constant-current drives the light-emitting element 802.

(Control Arithmetic Circuit 112)

As shown in FIG. 1, the control arithmetic circuit 112 stores the range of the current value necessary for driving at least two types of light-emitting element 802, as data in the form of the constant-current value tables 151 and 152 (drive information).

Figure 2:
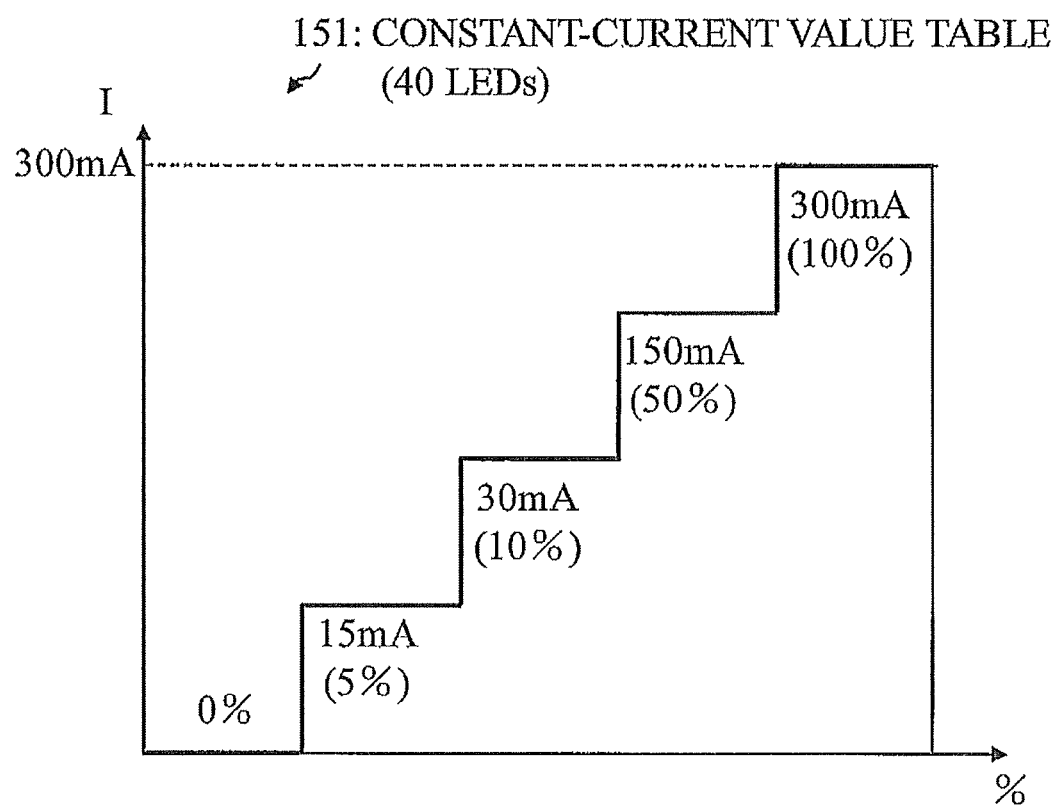
FIG. 2 is a constant-current value table 151 of the first embodiment.

FIG. 2 is a concept graph showing an example of the constant-current value table 151.

Figure 3:
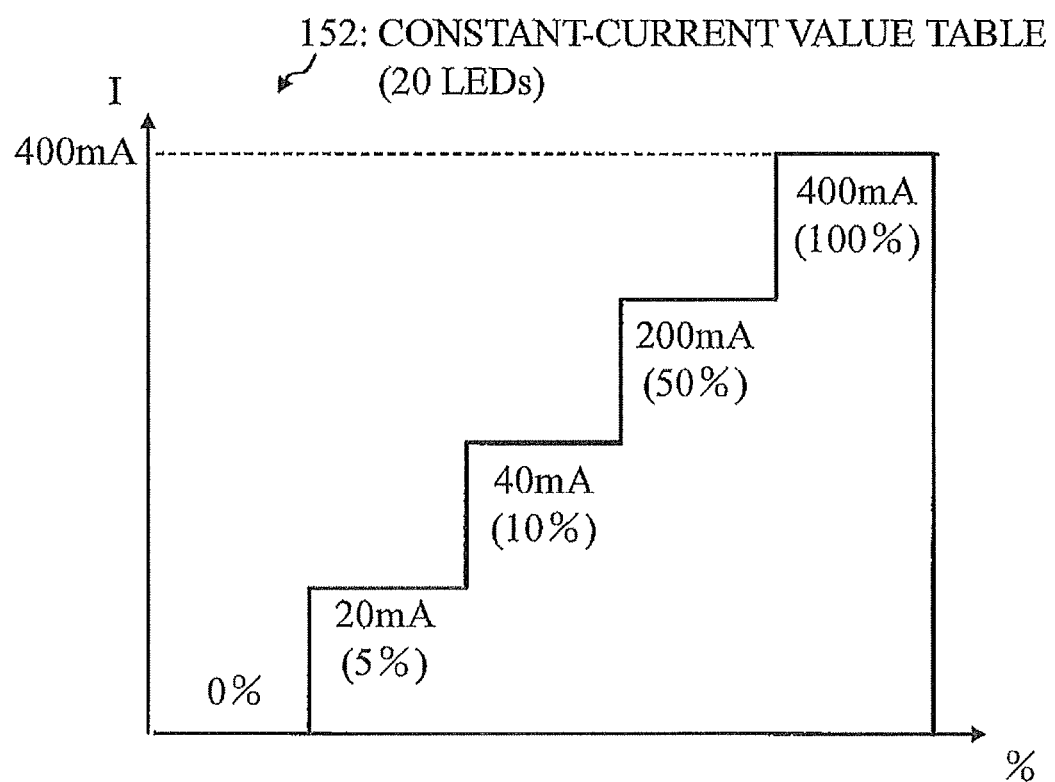
FIG. 3 is a constant-current value table 152 of the first embodiment.

FIG. 3 is a concept graph showing an example of the constant-current value table 152.

In FIGS. 2 and 3, the axis of abscissa represents the lighting control factor (dimming factor), and the axis of ordinate represents the target current value corresponding to the lighting control factor. For the sake of descriptive convenience, each of the constant-current value tables 151 and 152 shows a lighting control factor of 5% to 100% which is expressed in five levels when the level of 0% is counted. The constant-current value table shows, by stepwise representation, a digital current value of 100% to 0% necessary for obtaining a desired light-emission output from each light-emitting element 802 (LED series circuit). The constant-current value table is preset in advance, and stored in a memory 113 included in the control arithmetic circuit 112. In the constant-current value tables 151 and 152, a current value (constant-current value information) is specified for each lighting control factor. However, the value to be stored in the constant-current value tables 151 and 152 is not limited to the current value. A value (another example of the constant-current value information) corresponding to the current value may be stored.

The constant-current value table 151 of FIG. 2 is a table for the LED series circuit 851 (40) including 40 LEDs. In the case of the LED series circuit 851 (40), the current value corresponding to the 100% output is 300 mA.

The constant-current value table 152 of FIG. 3 is a table for the LED series circuit 851 (20) including 20 LEDs. In the case of the LED series circuit 851 (20), the current value corresponding to the 100% output is 400 mA.

The lighting controller 103 outputs a PWM (Pulse Width Modulation) signal as the lighting control signal. The lighting controller 103 outputs, as the lighting control signal, the PWM signal that changes the light-emission output of the light-emitting element 802. The lighting control signal outputted by the lighting controller 103 is, e.g., a PWM signal, having a pulse-width duty ratio which changes within the range of 100% to 5%.

(Control Arithmetic Circuit 112)

The control arithmetic circuit 112 reads the lighting control signal from the lighting controller 103, and reads the digital value of the constant-current value table (a selected one of the constant-current value tables 151 and 152) according to the ratio indicated by the duty ratio of the lighting control signal. The control arithmetic circuit 112 then converts the digital value into a PWM signal corresponding to the target current value, and sends the obtained PWM signal to the integration circuit 130.

(Integration Circuit 130)

The integration circuit 130 converts the PWM signal sent from the control arithmetic circuit 112 into a DC voltage, and sends the DC voltage to the voltage dropping circuit 121. The voltage dropping circuit 121 generates, by adjustment, a load voltage necessary for supplying a current to the LED series circuit 851, such that the voltage detected by the current detection circuit 122 becomes equal to the voltage corresponding to the target current value outputted by the integration circuit 130.

Hence, the power converter circuit 120 can constant-current drive the light-emitting element 802 with the lighting control signal of the lighting controller 103 and the target current value which is determined by the constant-current value table of the control arithmetic circuit 112. Since the power factor correction circuit 110 performs power factor correction and the power converter circuit 120 performs constant-current drive, the power supply circuit 100 operates as a constant-current circuit having a high power factor and a high efficiency.

(Checking Current)

When the commercial power supply 101 is turned on, the commercial power supply 101 starts supplying power to the power supply circuit 100, and the power factor correction circuit 110, the power converter circuit 120, and the control arithmetic circuit 112 start operation. During a predetermined period of time since the commercial power supply 101 is turned on, the control arithmetic circuit 112 sends, to the power converter circuit 120, a signal causing the power converter circuit 120 to output a "checking current" which is a predetermined small-value constant current. The voltage detection circuit 123 detects the voltage of the LED series circuit 851 when the LED series circuit 851 is being driven by the checking-current value. The control arithmetic circuit 112 reads the detected voltage of the LED series circuit 851, and compares it with a preset value, to check whether the number of LEDs connected to the light-emitting element 802 is 40 or 20. After that, the control arithmetic circuit 112 selects a preset constant-current value table (either the table for 40 LEDs or the table for 20 LEDs) corresponding to the number of LEDs connected. Using the selected table, the control arithmetic circuit 112 drives the light-emitting element 802 with a constant-current value that matches the ratio (lighting control factor) of the lighting control signal sent from the lighting controller 103.

Figure 4:
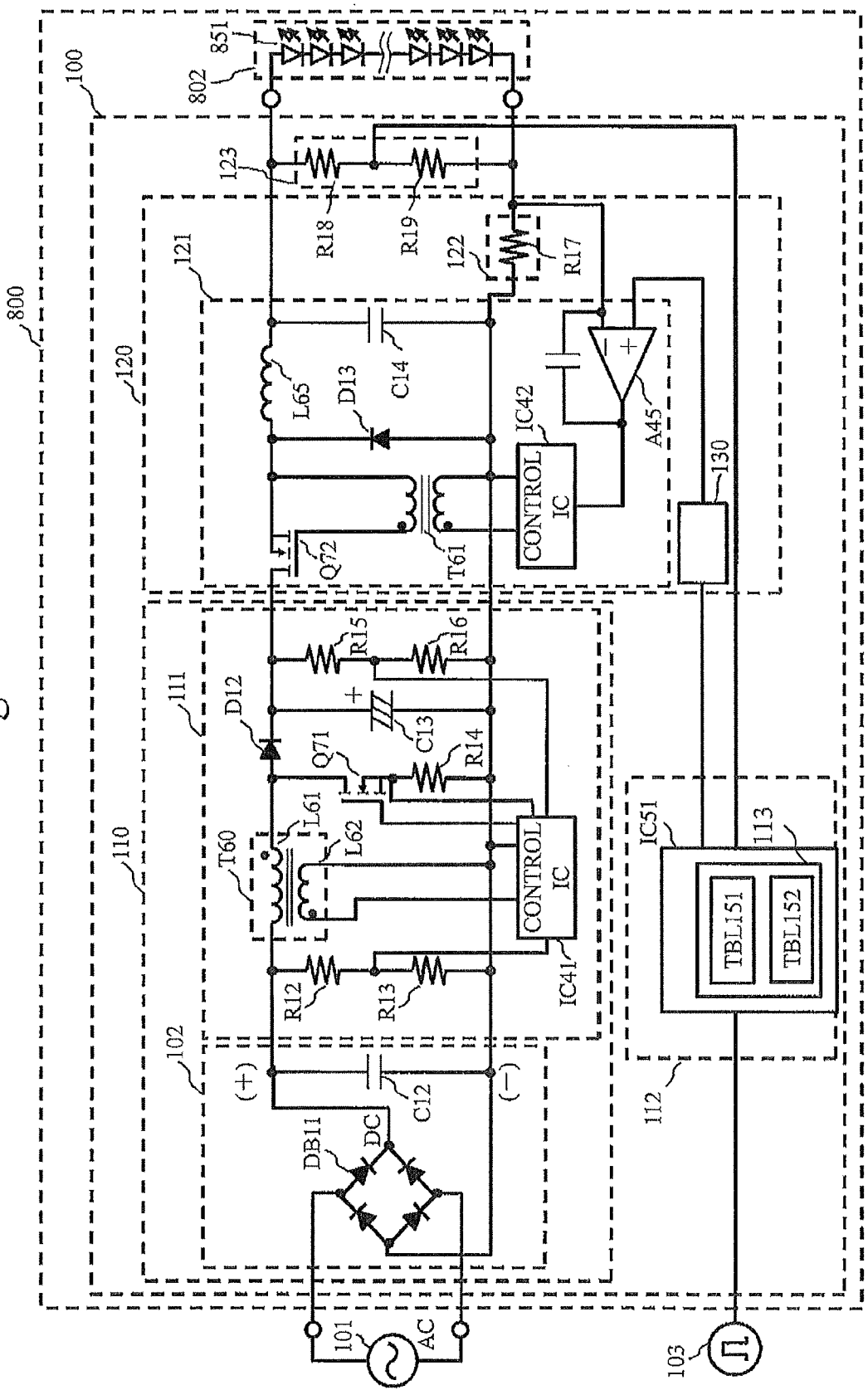
FIG. 4 is a specific circuit diagram of the luminaire 800 of the first embodiment.

FIG. 4 is an electric circuit diagram showing an example of the practical circuit configuration of the luminaire 800 according to the first embodiment. To obtain a desired light-emission output with the LED series circuit 851 (40) having 40 LEDs, a current of 300 mA to 0 mA need be supplied. To obtain a desired light-emission output with the LED series circuit 851 (20) having 20 LEDs, a current of 400 mA to 0 mA need be supplied. Different light-emission outputs are required of a luminaire having 40 LEDs and a luminaire having 20 LEDs, as a matter of course. If the LED series circuit 851 (20) having 20 LEDs is to be used with a current of 300 mA to 0 mA in the same manner as the LED series circuit 851 (40) having 40 LEDs, it can be coped with by a conventional constant-current drive power supply circuit. Hence, the function of the power supply circuit 100 is not necessary.

(Power Factor Correction Circuit 110)

For example, the power factor correction circuit 110 is a booster converter circuit (also referred to as a "PFC circuit"), and roughly consists of the rectifier circuit 102 and the voltage booster circuit 111.

(1) For example, the rectifier circuit 102 has a diode bridge DB11 and a capacitor C12. The diode bridge DB11 is constituted by bridge-connected four rectifier elements, and generates a pulsating voltage by full-wave rectification of the AC voltage inputted from the commercial power supply 101. The capacitor C12 has a comparatively small capacitance, and is mainly used to cut the high-frequency noise.

(2) For example, the voltage booster circuit 111 is constituted by a transformer T60, a switching element Q71, a diode D12, a smoothing capacitor C13, input-voltage side voltage divider resistors R12 and R13, a current detection resistor R14, output-voltage side voltage divider resistors R15 and R16, and a control IC41. The transformer T60 has a main winding L61 and an auxiliary winding L62. As the control IC41, for example, a control IC for a power factor correction circuit is used. In FIG. 4, the mark for a field-effect transistor (to be referred to as a "FET" hereinafter) is employed to indicate the switching element Q71. The switching element Q71 is not limited to a FET, but can be another electric switch such as a bipolar transistor, or another mechanical switch such as a machine type switch. When the control IC41 turns on/off the switching element Q71 with a high-frequency wave (having, e.g., several 10 kHz to several 100 kHz), the energy is accumulated in the main winding L61 of the transformer T60 during the ON period, and the accumulated energy and the energy supplied from the rectifier circuit 102 are charged in the smoothing capacitor C13 in the OFF period. Hence, the smoothing capacitor C13 is charged with a voltage higher than the peak voltage of the pulsating voltage (to be referred to as the "input voltage" hereinafter) outputted from the rectifier circuit 102. The power factor correction circuit 110 outputs, as the output voltage, the voltage charged in the smoothing capacitor C13. The two voltage divider resistors R12 and R13 detect the voltage value of the input voltage. The auxiliary winding L62 of the transformer T60 detects the timing at which the current terminates flowing through the main winding L61 of the transformer T60. The current detection resistor R14 detects the current value flowing through the switching element Q71.

(Control IC41)

Based on these detection results, the control IC41 adjusts the timing to turn on/off the switching element Q71 such that the waveshape of the current flowing into the power factor correction circuit 110 is similar to that of the input voltage. Power factor is thus corrected. As a result, the power factor of the power supply circuit 100 becomes close to 1, so that harmonic component regulation can be coped with as well. The control IC41 inputs an output voltage voltage-divided by the voltage divider resistors R15 and R16, and controls the ON/OFF ratio of the switching element Q71 so that a preset output voltage is achieved. In general, the output voltage of the power factor correction circuit is often set higher than the peak value of the input voltage. For example, if the maximum input voltage is AC 256 V, the output voltage of the power factor correction circuit is set to DC 400 V or higher.

(Control Arithmetic Circuit 112)

For example, the control arithmetic circuit 112 is provided with a microcomputer IC51. More specifically, the control arithmetic circuit 112 is implemented by, e.g., the microcomputer IC51. The microcomputer IC51 reads the duty ratio of the PWM signal of the lighting control signal outputted from the lighting controller 103, and sends a PWM signal in the constant-current value table preset by the software program and corresponding to the target current value that matches the duty ratio of the lighting control signal, to the integration circuit 130.

For example, the constant-current value table is the one shown in FIG. 2 or 3. As described above, in the constant-current value table, a constant-current value of 100% is determined as the value necessary for lighting the LED series circuit 851 connected, to emit light with a desired light-emission output, and the constant-current value is set as a digital value that changes within the range of 100% to 0% stepwise in several levels to several 100 levels. As shown in FIG. 4, the microcomputer IC51 stores the constant-current value table 151 of the LED series circuit 851 (40) and the constant-current value table 152 of the LED series circuit 851 (20), in the form of digital values in the memory 113 of the microcomputer IC51. This has been described with reference to FIGS. 2 and 3. In this manner, the constant-current value table 151 (300 mA to 0 mA) for the series-connected 40 LEDs and the constant-current value table 152 (400 mA to 0 mA) for the series-connected 20 LEDs are stored in the memory 113 of the microcomputer IC51 in advance. Pertinent digital values are set and stored in the constant-current value tables 151 and 152 in several levels to several 100 levels.

(1) The microcomputer IC51 reads, from the constant-current value table, a digital value corresponding to the duty ratio of the lighting control signal sent from the lighting controller 103, converts the obtained digital value into a PWM signal representing the pulse-width duty ratio, and sends the PWM signal to the integration circuit 130.

(2) When receiving the PWM signal, the integration circuit 130 generates a DC voltage corresponding to the target current value from the pulse width. The DC voltage outputted from the integration circuit 130 and corresponding to the target current value is input to an error amplifier A45.

The signal sent from the microcomputer IC51 to the integration circuit 130 may be a DC voltage. In this case, the integration circuit 130 serves as a filter formed of CR, and sends the DC voltage corresponding to the target current value to the error amplifier A45. The microcomputer IC51 reads a digital value corresponding to the duty ratio of the lighting control signal sent from the lighting controller 103, from the constant-current value table, converts the digital value into an analog voltage value, and sends the analog voltage value to the integration circuit 130.

(Lighting Controller 103)

The lighting controller 103 outputs, as a PWM signal (having a fixed frequency and a pulse-width duty ratio that changes in the range of 100% to 5%), a lighting control signal for changing the brightness of e.g., the luminaire 800. When the duty ratio of the lighting control signal is in the range of 100% to 5%, the lighting controller 103 can change the current within the range of:

300 mA to 15 mA when the luminaire 800 incorporates 40 LEDs; and 400 mA to 20 mA when the luminaire 800 incorporates 20 LEDs as described above.

Operation will be described hereinafter which takes place after the microcomputer IC51 selects a constant-current value table in number-of-LEDs checking using the checking current. The lighting control signal output from the lighting controller 103 is input to the microcomputer IC51. After reception of the lighting control signal, the microcomputer IC51 searches for a digital value which is a target current value corresponding to the pulse-width duty ratio of the lighting control signal, from the constant-current value table stored in advance. The microcomputer IC51 converts the digital value of the target current value into a PWM signal, and sends the PWM signal to the integration circuit 130. The integration circuit 130 integrates the PWM signal of the target current value, to convert the PWM signal into a DC voltage needed to supply the target current value. The integration circuit 130 sends a voltage corresponding to the target current value to the error amplifier A45 in the voltage dropping circuit 121. In this manner, the content of the lighting control signal outputted from the lighting controller 103 can be reflected as a constant-current value that drives the LED series circuit 851.

(When Lighting Controller is not Connected)

When the lighting controller 103 is not connected, namely, when the lighting control signal is not input to the microcomputer IC51, the microcomputer IC51 recognizes that the lighting control signal is not present, and then constant-current drives the LED series circuit 851 with a constant-current value corresponding to 100% in the selected constant-current value table (the table selected in the number-of-LEDs checking). In other words, the LED series circuit 851 is constant-current driven by 300 mA when the number of LEDs connected is 40, and by 400 mA when the number of LEDs connected is 20.

The first embodiment shows a case wherein, when the lighting controller 103 is not connected, the LED series circuit 851 is driven by a constant current corresponding to 100% in the constant-current value table. The constant current can be arbitrarily set by the software of the microcomputer IC51, as a matter of fact.

The technical terms and phrases which are employed or will be employed in the above explanation and in the following explanation are summarized as follows.

(1) The "constant-current value table" is information written in the memory 113 of the microcomputer IC51 in advance, and includes the constant-current value table 151 for 300 mA (40 LEDs) and the constant-current value table 152 for 400 mA (20 LEDs), as shown in FIGS. 2 and 3. Each table is divided by a line plotted along digital values of 100% to 0%.

(2) The "lighting control signal" is a PWM signal outputted from the lighting controller 103. The pulse-width duty ratio of the lighting control signal changes within the range of 100% to 5% (lighting control factor). The lighting control factor does not fall below 5%.

(3) The "target current value" refers to the constant-current value which is to be supplied to an arbitrary LED series circuit 851, and is determined by the lighting control signal. In other words, the target current value is determined by (the maximum current value) (100%)×(lighting control factor). As shown in FIG. 2, with the LED series circuit 851 (40), 100% corresponds to 300 mA. Hence, 5% corresponds to 15 mA, 10% corresponds to 30 mA, and 50% corresponds to 150 mA. The same applies to the case of the LED series circuit 851 (20) having 20 LEDs shown in FIG. 3.

(4) The "number-of-LEDs checking" is a process conducted by the microcomputer IC51 (control arithmetic circuit 112). The microcomputer IC51 checks whether the LED series circuit 851 connected to the power supply circuit 100 is the LED series circuit 851 (40) having 40 LEDs or the LED series circuit 851 (20) having 20 LEDs. This is the number-of-LEDs checking.

(5) The "number-of-LEDs checking voltage" is a reference voltage value that serves as the control to be compared with the voltage of the light-emitting element 802 (LED series circuit 851) which is detected by the voltage detection circuit 123 when a "checking current value (15 mA)" is supplied to the LED series circuit 851. Since the voltage applied to the LED series circuit 851 cannot be directly input to the microcomputer IC51, the voltage detected by the voltage detection circuit 123 is input to the microcomputer IC51. For example, the voltage detection circuit 123 is a voltage divider resistor, as shown as the voltage detection circuit 123 in FIG. 4. The voltage detection circuit 123 voltage-divides the high voltage applied to the LED series circuit 851, to obtain a low voltage that can be input to the microcomputer IC51. Hence, the number-of-LEDs checking voltage as a control to be compared is stored in the memory 113 of the microcomputer IC51 in advance considering the ratio of the voltage divider resistor of the voltage detection circuit 123.

(6) The "number-of-LEDs checking start time" refers to the time period since the commercial power supply is turned on until the timing at which the voltage of the LED series circuit 851 is fetched by the A/D port of the microcomputer IC51. The "number-of-LEDs checking start time" is stored in the memory 113 of the microcomputer IC51 in advance.

(Power Converter Circuit 120)

The power converter circuit 120 is, for example, a voltage dropping converter circuit (voltage dropping type DC/DC converter), and has the voltage dropping circuit 121, the current detection circuit 122, and the integration circuit 130. The voltage dropping circuit 121 is constituted by, for example, a switching element Q72, a diode D13, a choke coil L65, a capacitor C14, a pulse transformer T61, a control IC42, and the error amplifier A45. The current detection circuit 122 is, for example, a current detection resistor R17. The switching element Q72 is not limited to an PET, as with the switching element Q71, but may be an electrical switch such as a bipolar transistor, or a switch having another mechanism.

(1) The control IC42 is, for example, a control IC for a switching power supply.

(2) The integration circuit 130 is an integration circuit, and generates a DC voltage by integrating the PWM signal transmitted from the microcomputer IC51.

(3) The pulse transformer T61 is, for example, an isolation transformer, and used for isolating the switching element Q72 connected to the high-potential side of the output voltage of the power factor correction circuit 110, when the switching element Q72 is to be driven by the control IC42 connected to the low potential side.

(4) The control IC42 turns on/off the switching element Q72 with a high-frequency wave (e.g., several 10 kHz to several 100 kHz) via the pulse transformer T61.

(5) In the ON period of the switching element Q72, the output voltage of the power factor correction circuit 110 is transmitted to the power converter circuit 120. Namely, the capacitor C14 is charged by the smoothing capacitor C13 while an electromagnetic energy is being accumulated in the choke coil L65.

(6) In the OFF period of the switching element Q72, the electromagnetic energy accumulated in the choke coil L65 charges the capacitor C14 while circulating via the diode D13. Repetition of this operation charges the capacitor C14. Hence, the capacitor C14 is charged with a voltage lower than the voltage (that is the DC voltage generated by the power factor correction circuit 110) inputted to the power converter circuit 120.

(7) The power converter circuit 120 charges the capacitor C14 with a load voltage necessary for supplying a current having the target current value to the LED series circuit 851.

(8) The load voltage charged in the capacitor C14 is the sum voltage of the voltage necessary for supplying the current having the target current value to the LED series circuit 851 and the voltage drop in the current detection resistor R17. Note that the voltage generated by the voltage drop in the current detection resistor R17 is considerably lower than the voltage that drives the LED series circuit 851 with the target current value.

The current detection resistor R17 is electrically connected in series to the LED series circuit 851. The same current flowing through the LED series circuit 851 flows through the current detection resistor R17. The integration circuit 130 receives the PWM signal corresponding to the target current value outputted from the microcomputer IC51, and generates a DC voltage corresponding to the target current value by integrating the PWM signal.

(Error Amplifier A45)

The error amplifier A45 is, for example, an operational amplifier, and changes the output signal such that the voltages applied to its two input terminals become equal. According to the first embodiment, the DC voltage corresponding to the target current value from the integration circuit 130 and the voltage generated in the current detection resistor R17 are input to the error amplifier A45. The voltage generated in the current detection resistor R17 is a voltage drop occurring as (the current flowing in the LED series circuit 851)×R17.

The error amplifier A45 sends an output signal to the control IC42 so that the DC voltage corresponding to the target current value from the integration circuit 130 and the voltage drop in the current detection resistor R17 become equal. The control IC42, after reception of the output signal from the error amplifier A45, adjusts the load value to be charged in the capacitor C14, by adjusting the on/off duty ratio and the like of the switching element Q72 via the pulse transformer T61, so that a current having the target current value flows to the LED series circuit 851. By repetition of this operation, the power converter circuit 120 operates such that the voltages at the two input terminals of the error amplifier A45 coincide with each other. Therefore, the LED series circuit 851 can always be driven by the target current value that matches the lighting control signal. Hence, the power converter circuit 120 can constant-current drive the LED series circuit 851 by the current having the target current value which is determined by the duty ratio of the lighting control signal from the lighting controller 103 and the constant-current value table.

(LED Series Circuit 851)

The LED series circuit 851 will now be described. The LED series circuit 851 is a load circuit in which, e.g., at least two LEDs are connected in series, as described above. According to the first embodiment, either one of the LED series circuit 851 (40) in which 40 LEDs are connected in series and the LED series circuit 851 (20) in which 20 LEDs are connected in series, is connected as the LED series circuit 851 to the power converter circuit 120. The LED has a characteristic feature in that the current does not flow in it unless a certain degree of voltage is applied to the LED. The forward voltage of the LED after the current starts flowing changes depending on the current value supplied. The forward voltage of the LED fluctuates in the manufacture. Hence, as the forward voltage of the LED, the voltage generated when a rated current is supplied to the LED is listed on the data sheet or the like of the product. In an LED used for lighting, when a rated current of 400 mA is supplied, the forward voltage fluctuates in the manufacture between 3.2 V and 4.0 V (where the temperature is +25° C.). The forward voltage of the LED has negative temperature characteristics, as with a diode; it tends to decrease as the temperature increases, and tends to increase as the temperature decreases (the temperature ranges between, e.g., −25° C. and +50° C.).

Figure 5:
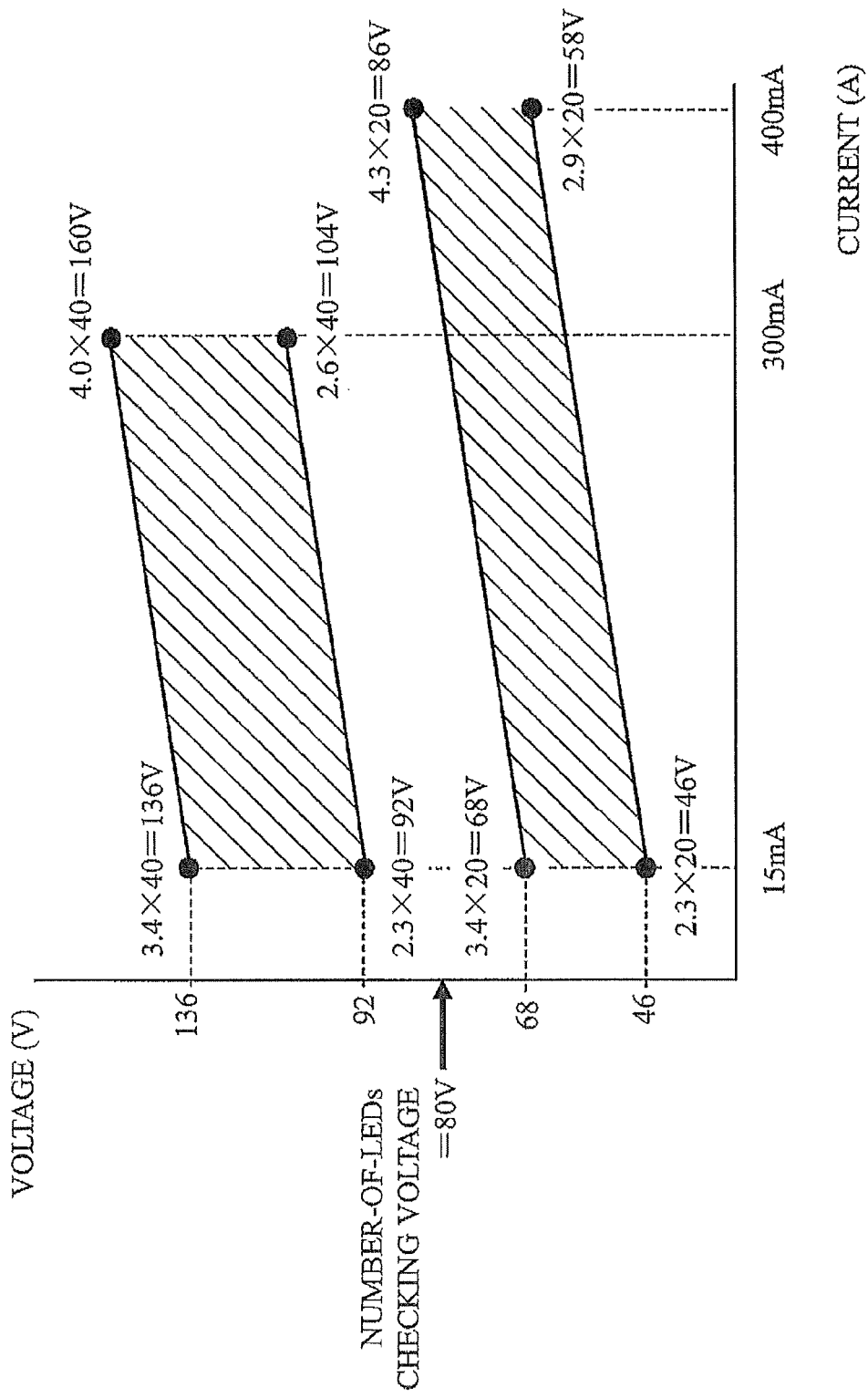
FIG. 5 is a graph showing the relation between the current and the forward voltage of each of an LED series circuit 851 constituted by 40 LEDs and an LED series circuit 851 constituted by 20 LEDs of the first embodiment.

FIG. 5 shows examples of a current-voltage characteristic graphs of cases wherein the LED series circuit 851 has 40 LEDs and 20 LEDs, respectively, with the characteristic features in the forward voltage of the LED being considered. Namely, FIG. 5 shows the temperature-voltage characteristics of the LED series circuit 851 having 40 LEDs and of the LED series circuit 851 having 20 LEDs. In FIG. 5, the range of the forward voltage for a current of 15 mA is determined to "2.3 V to 3.4 V". At 100%, the forward voltage range for the LED series circuit 851 (40) is determined to "2.6 V to 4.0 V", and the forward voltage range for the LED series circuit 851 (20) is determined to "2.9 V to 4.3 V".

Based on the above forward voltage, it can be estimated that when a current of 15 mA is supplied to the LED series circuit 851, the voltage changes in the range of 92 V to 136 V in the case of 40 LEDs, and in the range of 46 V to 68 V in the case of 20 LEDs. As a result, a number-of-LEDs checking voltage may be selected considering a voltage between the minimum voltage of the case using 40 LEDs and the maximum voltage of the case using 20 LEDs. It can be judged that the number of LEDs is 40 if the actual voltage is higher than the number-of-LEDs checking voltage; and 20 if lower than the number-of-LEDs checking voltage.

In the first embodiment, the number-of-LEDs checking voltage is set considering a voltage between 68 V and 92 V, namely, 80 V.

(Number-of-LEDs Checking Operation)

The number-of-LEDs checking operation, with which the number of LEDs connected is checked, will be explained.

Figure 6:
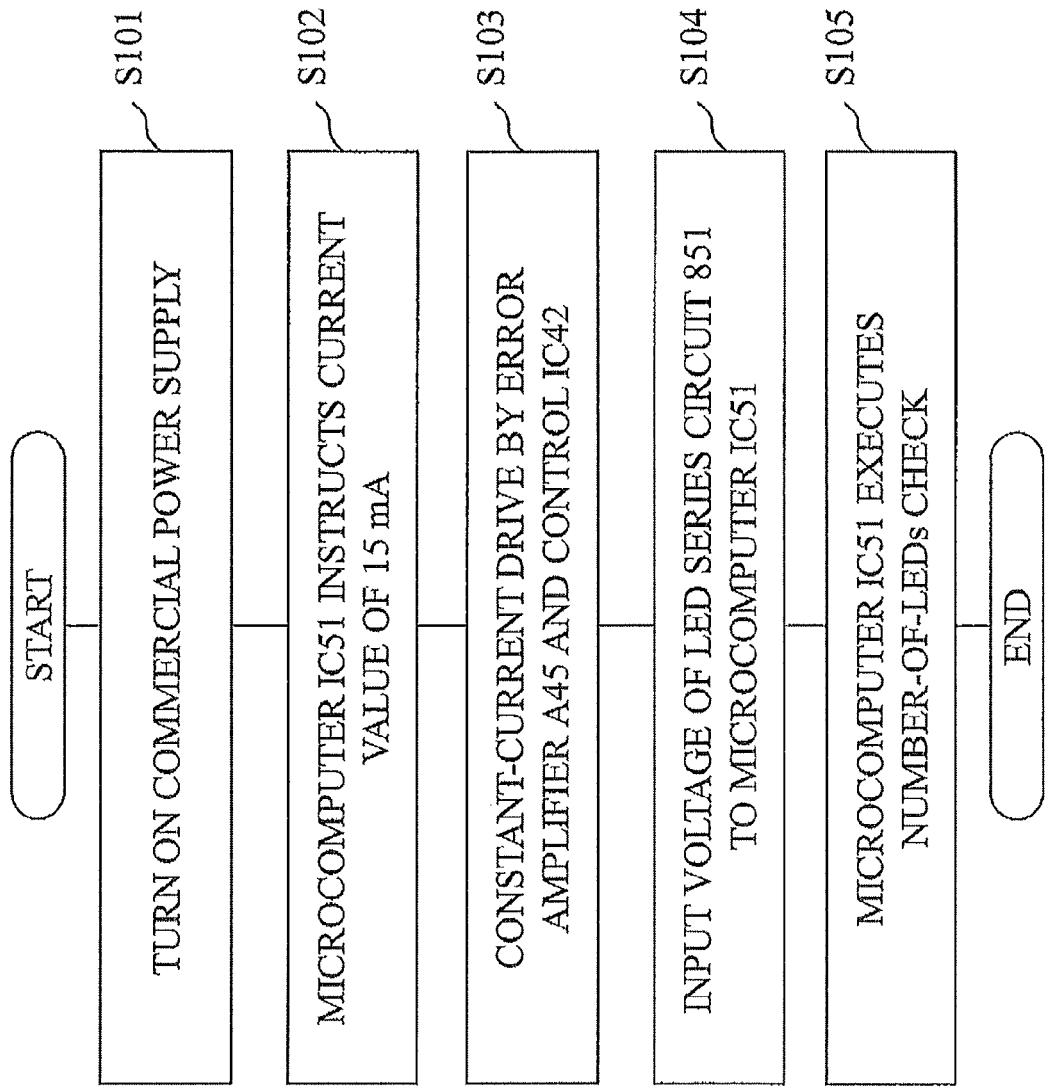
FIG. 6 is a flowchart showing the number-of-LEDs checking operation in the first embodiment.

FIG. 6 is a flowchart of the number-of-LEDs checking operation. An explanation will be made referring to FIG. 6. Either one of the LED series circuit 851 having a series connection of 40 LEDs and the LED series circuit 851 having a series connection of 20 LEDs will be used. At this time point, whether the LED series circuit 851 having a series connection of 40 LEDs is connected or the LED series circuit 851 having a series connection of 20 LEDs is connected is unknown to the power supply circuit 100 side.

The luminaire 800 is connected to the commercial power supply 101 and the lighting controller 103. In the luminaire 800, the light-emitting element 802 (either one of the LED series circuit 851 (40) and the LED series circuit 851 (20)) is connected to the power supply circuit 100.

First, the luminaire 800 is turned on. More specifically, an AC voltage having a commercial frequency is input from the commercial power supply 101 (S101). The inputted AC voltage is rectified to a pulsating voltage by the rectifier circuit 102 and sent to the voltage booster circuit 111. The voltage booster circuit 111 corresponds to the voltage boosting converter of the PFC circuit. Hence, the voltage booster circuit 111 charges the smoothing capacitor C13 with the output voltage while correcting the power factor, such that the voltage becomes higher than the peak voltage of the pulsating voltage obtained by rectifying the AC voltage.

At this time, the microcomputer IC51 that has started operation sends a PWM signal, adapted to supply a constant current (checking current) of 15 mA to the LED series circuit 851 (whether the LED series circuit 851 has 40 LEDs or 20 LEDs is not known at this stage), to the integration circuit 130 regardless of the presence/absence of the lighting control signal from the lighting controller 103 or the duty ratio of the lighting control signal (S102). The integration circuit 130 converts the PWM signal into a DC voltage necessary to supply a 15-mA current, and sends the obtained DC voltage to the error amplifier A45. The error amplifier A45 sends an output signal to the control IC42 such that the voltage drop occurring in the current detection resistor R17 and the DC voltage to be inputted from the integration circuit 130 become equal. Based on the output signal from the error amplifier A45, the control IC42 controls the ON/OFF ratio of the switching element Q72 via the pulse transformer T61, to adjust the voltage to be charged in the capacitor C14, so a constant current of 15 mA flows in the LED series circuit 851.

As the power converter circuit 120 operates as a constant-current circuit, the current flowing in the LED series circuit 851 is determined by the voltage which is inputted to the error amplifier A45. Hence, the LED series circuit 851 connected, whether it has 40 LEDs or 20 LEDs, is constant-current driven by 15 mA (S103).

The voltage detection circuit 123 includes, e.g., voltage divider resistors R18 and R19. The voltage divider resistors R18 and R19 divide the voltage to be applied to the LED series circuit 851, and send the resultant divisional voltage to the microcomputer IC51 (S104).

At the lapse of a preset number-of-LEDs checking start time since the power supply is turned on, the voltage divider resistors R18 and R19 divide the voltage to be applied to the LED series circuit 851 which is continuously under constant-current drive by 15 mA. The microcomputer IC51 fetches the voltage divided by the voltage divider resistors R18 and R19 from its A/D port. The microcomputer IC51 compares the divided, fetched voltage with data on the number-of-LEDs checking voltage (corresponding to 80 V) stored in the memory 113 in advance, and checks whether the voltage fetched in accordance with the ratio of the voltage divider resistors R18 and R19 corresponds to the number-of-LEDs checking voltage (80 V). If the voltage divided and fetched is equal to or higher than 80 V which is the number-of-voltage checking voltage, the microcomputer IC51 judges that the LED series circuit 851 connected is the LED series circuit 851 (40); if less than 80 V, the microcomputer IC51 judges that the LED series circuit 851 connected is the LED series circuit 851 (20) (S105).

For example, assume that the voltage divider resistors R18 and R19 are set to have a resistance of 39 kΩ and 1 kΩ, respectively, and that the number-of-LEDs checking voltage is 2.0 V. When the voltage of the LED series circuit 851 under 15-mA constant-current drive is 100 V, the voltage detection circuit 123 outputs 2.5 V, and the microcomputer IC51 judges that the LED series circuit 851 connected is the LED series circuit 851 (40). When the voltage of the LED series circuit 851 under 15-mA constant-current drive is 60 V, the voltage detection circuit 123 outputs 1.5 V, and the microcomputer IC51 judges that the LED series circuit 851 connected is the LED series circuit 851 (20).

As indicated by the graph of FIG. 5, a voltage in the range of 68 V to 92 V is not generated in the first embodiment. If the voltage of the LED series circuit 851 under 15-mA constant-current drive becomes 80 V, the voltage detection circuit 123 outputs 2.0 V, and the microcomputer IC51 judges that the LED series circuit 851 connected is the LED series circuit 851 (40).

At this time, the voltage detected by the voltage detection circuit 123 is slightly lower than the voltage which the power converter circuit 120 generates in order to supply a constant current to the LED series circuit 851, that is, the voltage charged in the capacitor C14. Strictly, the voltage charged in the capacitor C14 corresponds to (the voltage applied to the LED series circuit 851)+(the voltage drop of the current detection resistor R17). However, the voltage caused by the voltage drop of the current detection resistor R17 is considerably lower than the voltage needed to supply a current to the LED series circuit 851, and is accordingly negligible in number-of-LEDs checking. Assuming that the resistance of the current detection resistor R17 is 1Ω, even when a 15-mA current is supplied, the voltage drop is 15 mV. This value is considerably low as compared to the voltage of 100 V or 60 V, which is to be applied to the LED series circuit 851.

If the LED series circuit 851 (40) is connected as the LED series circuit 851, from the graph of FIG. 5, the voltage of the LED series circuit 851 when 15 mA is supplied is 80 V or more, even with the fluctuation in the manufacture and a temperature change being considered. Thus, the microcomputer IC51 judges that the LED series circuit 851 connected is the LED series circuit 851 (40). After this checking, with the recognition that the LED series circuit 851 connected is the LED series circuit 851 (40), based on the constant-current value table 151 for the LED series circuit 851 (40), the microcomputer IC51 sends to the integration circuit 130, a PWM signal with a constant-current value (300 mA×(the duty ratio of the lighting control signal)=target current value) that matches the lighting control signal from the lighting controller 103 is obtained.

The integration circuit 130 sends a voltage corresponding to the target current value generated, to the error amplifier A45. The error amplifier A45 sends an output signal to the control IC42 such that the two terminal voltages become equal. As a result, using the constant-current value table 151 for the LED series circuit 851 (40) (because the LED series circuit 851 having a series connection of 40 LEDs is currently connected), the power converter circuit 120 can constant-current drive the LED series circuit 851 (40) with an arbitrary target current value (between 300 mA and 15 mA) that matches the duty ratio (100% to 5%) of the lighting control signal sent from the lighting controller 103.

After the number-of-LEDs checking is ended, the microcomputer IC51 alters the PWM signal to be sent to the integration circuit 130, from a PWM signal for supplying 15 mA to the LED series circuit 851 (40), to a PWM signal necessary to supply an arbitrary target current value (between 300 mA and 15 mA) that matches the duty ratio (100% to 5%) of the lighting control signal sent from the lighting controller 103.

The first embodiment has described the operation of the case wherein the LED series circuit 851 (40) is connected. When the LED series circuit 851 (20) is connected, at the lapse of the number-of-LEDs checking start time since the power supply is turned on, the microcomputer IC51 fetches the voltage of the LED series circuit 851, and compares it with the data on the number-of-LEDs checking voltage. The voltage of the LED series circuit 851 is judged to be less than 80 V. Thus, after this, the target current value is generated using the constant-current value table 152 for the LED series circuit 851 (20).

The number-of-LEDs checking is conducted only at the lapse of the number-of-LEDs checking start time since the power supply is turned on, regardless of whether the number of LEDs is 40 or 20. When 20 LEDs are connected, even if the voltage applied to the LED series circuit 851 (20) becomes 80 V or more after the number-of-LEDs checking is ended, the number-of-LEDs checking operation does not occur, and accordingly no problem arises.

According to the first embodiment, the constant-current value (checking current value) supplied until the lapse of the number-of-LEDs checking start time since the power supply is turned on is set to 15 mA. Also, according to the first embodiment, the pulse-width duty ratio of the lighting control signal (PWM signal) is set in the range of 100% to 5%. In the constant-current value tables 151 and 152, the current values of several 10 to several 100 digital levels are set in the range of:

300 mA to 0 mA for the case of 40 LEDs, and
400 mA to 0 mA for the case of 20 LEDs
to match the duty ratio of the lighting control signal.

For example, as shown in FIG. 2, the constant-current value table 151 for the case of 40 LEDs indicates a digital value (constant-current value information) of 300 mA corresponding to a lighting control signal having a duty ratio of 100%, and a digital value (constant-current value information) of 15 mA corresponding to a lighting control signal having a duty ratio of 5%

The constant-current value table 152 for the case of 20 LEDs shown in FIG. 3 indicates a digital value (constant-current value information) of 400 mA corresponding to a lighting control signal having a duty ratio of 100%, and a digital value (constant-current value information) of 20 mA corresponding to a lighting control signal having a duty ratio of 5%

Using the constant-current value tables, after the number-of-LEDs checking is ended, the microcomputer IC51 reads the duty ratio of the lighting control signal inputted, and determines the digital value of the constant-current value table corresponding to the duty ratio, as the digital value of the target current value. In order to send a signal to the integration circuit 130 using the digital value of the target current value, the microcomputer IC51 determines the pulse-width duty ratio of the PWM signal to be output to the integration circuit 130. As the integration circuit 130 converts the PWM signal into a DC voltage, the DC voltage generated then is the DC voltage corresponding to the target current value. The integration circuit 130 sends this DC voltage to the error amplifier A45. As a result, the power converter circuit 120 can constant-current drive the LED series circuit 851 by the target current value which is determined by the lighting control signal and the constant-current value table.

(Shift Speed of Constant-Current Value; when Power Supply is ON)

When the lighting control signal is set at 100%, after completion of the number-of-LEDs checking, the microcomputer IC51 tries to light the light-emitting element 802 (with 40 LEDs) to have an output of 100%. In this case, the microcomputer IC51 changes the duty ratio of the PWM such that the target current value increases gradually with a constant rate, instead of sharply switching the PWM signal that determines the target current value from a signal corresponding to 15 mA to a signal corresponding to 300 mA that matches 100%. More specifically, the microcomputer IC51 gradually changes the current value from 15 mA (first constant current) toward 300 mA (second constant current), for example, to 15 mA, 17 mA, 19 mA, . . . , then 300 mA. If the rate of change is set using the software of the microcomputer IC51 such that the current value changes at a rate of, e.g., 1%/5 msec, then the target current value to be supplied to the LED series circuit 851 can be gradually changed from 15 mA to 300 mA taking a time of "about 1.425 sec" (a predetermined period). Since the light-emission output of the LED changes not sharply but moderately, the resultant light emission does not make the people feel discomfort or unpleasant. In this manner, when shifting the power converter circuit 120 from the state of outputting 15 mA (first constant current) to the state of outputting 300 mA (second constant current), the microcomputer IC51 gradually changes the constant-current output from 15 mA to 300 mA during the time of "about 1.425 sec" (within a predetermined period).

(Shift Speed of Constant-Current Value; when Power Supply is not ON)

Other than the case of turning on the power supply, assume that the light-emission output of the LED is to be changed in accordance with the constant-current value table. For example, assume that, while the LED series circuit 851 is ON to provide a desired light-emission output (first constant current), the setting of the lighting controller 103 is changed, and that the duty ratio of the lighting control signal is changed. In this case as well, the microcomputer IC51 can gradually, moderately change the duty ratio of the PWM signal toward the target current value (second constant current) that has been changed in the same manner as in the case described above. Note that the microcomputer IC51 moderately changes the duty ratio of the PWM signal not only when the target current value increases but also when the target current value decreases.

(1) For example, assume that while the LED series circuit 851 (40) having 40 LEDs is under constant-current drive by 300 mA that matches the duty ratio of the lighting control signal being 100%, the setting of the lighting controller 103 is sharply changed to set the duty ratio of the lighting control signal to 10%. At this time, the microcomputer IC51 changes the PWM signal serving to supply the target control value, by gradually decreasing the PWM signal from 300 mA to 30 mA at a rate of 1%/5 msec.

(2) Assume that while the LED series circuit 851 (40) having 40 LEDs is under constant-current drive by 30 mA that matches the duty ratio of the lighting control signal being 10%, the setting of the lighting controller 103 is sharply changed to set the duty ratio of the lighting control signal to 70%. The microcomputer IC51 changes the PWM signal serving to supply the target control value, by gradually increasing the PWM signal from 30 mA to 210 mA at a rate of 1%/5 msec.

(3) In this manner, after a sharp change of the lighting control signal, the microcomputer IC51 changes the PWM signal toward the target current value (second constant current) at a constant rate. Even if the setting of the lighting controller 103 is changed sharply (e.g., to 30%/5 msec), the PWM signal changes only at a constant rate (1%/5 msec). Thus, the light-emission output from the LED does not change sharply, so it does not cause light flicker nor make people feel uncomfortable.

(4) When the lighting control signal is changed more moderately at a rate lower than 1%/5 msec (e.g., 0.5%/5 msec), the microcomputer IC51 changes the PWM signal until the target current value by following this change (0.5%/5 msec).

(Number-of-LEDs Checking Voltage)

According to the first embodiment, the number-of-LEDs checking voltage is set to 80 V. In the graph of FIG. 5, with the fluctuation of the LED forward voltage in the manufacture, temperature change, and the current-voltage characteristics being considered, the voltage of the LED series circuit 851 having a series connection of 40 LEDs and the voltage of the LED series circuit 851 having a series connection of 20 LEDs are:

136 V to 92 V for the LED series circuit 851 having 40 LEDs

68 V to 46 V for the LED series circuit 851 having 20 LEDs when the target current value is 15 mA. As the threshold value (the number-of-LEDs checking voltage with the voltage dividing ratio of the voltage detection circuit 123 being considered) used for checking whether the number of LEDs connected is 40 or 20, a value between the minimum voltage of the LED series circuit 851 having 40 LEDs and the maximum voltage of the LED series circuit 851 having the 20 LEDs is set in view of A/D fetching by the microcomputer IC51; the precision of the circuit constants, and the like. In the first embodiment, an intermediate value between 92 V and 68 V, that is, 80 V, is selected, and 2 V that matches this value is determined as the forward voltage.

With the above setting, even if fluctuations of the LED forward voltage in the manufacture or temperature change occurs, whether the LED series circuit 851 connected to the power supply circuit 100 has 40 LEDs or 20 LEDs can be checked stably.

FIG. 7 is a graph showing the graph indicating the relation between the time elapsed and the voltage in a case wherein the LED series circuit 851 has 40 LEDs. The axis of ordinate represents the voltage applied to the LED series circuit 851 (40) during the number-of-LEDs checking immediately after the power supply is turned on. The axis of abscissa represents the time taken since the power supply is turned on until the LED series circuit 851 is constant-current driven by the target current value. The duty ratio of the lighting control signal is 100%.

(1) Time A: The commercial power supply 101 starts supplying power to the power supply circuit 100. The power factor correction circuit 110, the power converter circuit 120, and the control arithmetic circuit 112 start operation.

(2) Time B: The smoothing capacitor C13 is charged with the output voltage from the power factor correction circuit 110, and shortly after that the power converter circuit 120 starts charging the capacitor C14 with a load voltage. A current does not flow through the LED unless a voltage with a certain magnitude is applied to the LED. Accordingly, the load voltage increases sharply.

(3) Time C: The voltage applied to the LED series circuit 851 (40) reaches "(a voltage with a certain magnitude)×40 (LEDs)", and a current starts flowing. At this time, the microcomputer IC51 controls the gradient of the current change to a constant degree, so the current increases moderately toward 15 mA.

(4) Time D: The current supplied to the LED series circuit 851 (40) reaches 15 mA.

(5) Time E: The number-of-LEDs checking start time has elapsed since the power supply is turned on. Hence, the microcomputer IC51 fetches the divided voltage of the LED series circuit 851 (40) generated by the voltage divider resistors R18 and R19. If the LED series circuit 851 (40) is connected, the fetched voltage exceeds a voltage corresponding to the number-of-LEDs checking voltage of 80 V. Hence, it is judged that 40 LEDs are connected. After the checking, the current increases moderately at a constant rate toward the target current value that matches the duty ratio of the lighting control signal being 100%.

(6) Time F: The current reaches the target current value. After that, constant-current drive continues with the current target current value of 300 mA as long as the setting of the lighting control signal is not changed.

(Checking Current Value)

According to the first embodiment, a current (checking current) supplied to check whether the LED series circuit 851 has 40 LEDs or 20 LEDs, immediately after the commercial power supply is turned on, is 15 mA regardless of the state of the lighting control signal (regardless of the magnitude of the duty ratio of the lighting control signal; also includes a case where no lighting control signal exists at all). This value of 15 mA is determined in the following manner. Between the constant-current value tables 151 and 152 prepared for the LED series circuits 851 to be connected, the current value that matches the duty ratio of 5%, in the range of the lighting control signal, is lower in the constant-current value table 151. Namely, in the constant-current value table 151 (where the duty ratio of 100% corresponds to 300 mA), the duty ratio of 5% corresponds to 15 mA. The value of the checking current is determined to match this case. The current supplied to the LED series circuit 851 is determined by the DC voltage generated by the integration circuit 130 in accordance with the PWM signal output from the microcomputer IC51. Hence, the power converter circuit 120 drives the light-emitting element 802 with the constant current of 15 mA regardless of whether the number of LEDs connected to 40 or 20.

Immediately after the power supply is turned on, the microcomputer IC51 performs constant-current drive at 15 mA, and checks whether the number of LEDs connected is 40 or 20 by measuring the voltage applied to the LED series circuit 851 during the constant-current drive. Then, using the respective constant-current value tables, constant-current drive is conducted using the target current value that matches the lighting control signal.
(Checking Current: 100 mA)

Assume that, immediately after the power supply is turned on, the voltage obtained when 100 mA is supplied is measured in order to check whether 40 LEDs or 20 LEDs are connected. Assume that 40 LEDs are connected, and that the lighting control signal is set at 5%. In this case, when the number-of-LEDs checking is ended, the power converter circuit 120 starts operation with the target current value being set at 15 mA. Consequently, immediately after the power supply is turned on, the LED series circuit 851 is lit by the checking current of 100 mA, and thereafter the checking current decreases to 15 mA. The light-emission output increases once to exceed the target LED light-emission output, and then decreases. This behavior during lighting leads to unnatural lighting operation. To people, this unnatural lighting operation appears as flickering, making them feel unpleasant.

As with the first embodiment, assume that the current for number-of-LEDs checking which is conducted immediately after the power supply is turned on is set to 15 mA. Even when the lighting control signal is set to, e.g., 5%, the checking current stays at 15 mA when 40 LEDs are connected, and changes only from 15 mA to 20 mA when 20 LEDs are connected. The LED light-emission output stays constant, or increases only slightly. As a result, the LED series circuit 851 can be constant-current driven by a target current value set by the lighting control signal, without flickering.

Assume that the lighting control signal is set to 100% and that, after a checking current of 15 mA is supplied to perform number-of-LEDs checking, the target current value increases to 300 mA or 400 mA. In this case, the current increases at a constant rate (e.g., 1%/5 msec, as described above) to obtain a LED light-emission output. This behavior during lighting is natural. No flickering occurs, and the lighting operation does not make people feel unpleasant.
(Checking Current Setting Method)

The checking current, which is to be supplied to the LED series circuit 851 for conducting number-of-LEDs checking immediately after the power supply is turned on, is determined to match the smallest current corresponding to a lighting control signal having a duty ratio of 5%, from among the plurality of types of LED series circuits 851 that can be connected, that is, among a plurality of constant-current value tables retained by the microcomputer IC51. Then, in the power supply circuit that performs number-of-LEDs checking, the current can be increased to the target current value at a constant rate immediately after the power supply is turned on. As a result, the LED series circuit 851 can be lit naturally without causing flickering, so people will not feel unpleasant.

In the power supply circuit 100 of the first embodiment, the pulse-width duty ratio of the lighting control signal is 100% to 5%. Accordingly, the lighting controller 103 does not output a lighting control signal having a duty ratio smaller than 5% (4% to 0%). In this manner, the duty ratio range of the lighting control signal output from the lighting controller 103 is 100% to 5%. In the constant-current value table, the duty ratio range for 5% and below (e.g., 4% to 0%) must also be set.

For example,
a digital value of 12 mA corresponding to a lighting control signal having a duty ratio of 4%, and
a digital value of 3 mA corresponding to a lighting control signal having a duty ratio of 1%
are set in the constant-current value table 151 for the 40 LEDs.

Also,
a digital value of 16 mA corresponding to a lighting control signal having a duty ratio of 4%, and
a digital value of 4 mA corresponding to a lighting control signal having a duty ratio of 1%
are set in the constant-current value table 152 for the 20 LEDs.

Note that, in a range where the light-emission output from the LED series circuit 851 is changed to a desired brightness, namely, in a range where the light-emission output from the LED series circuit 851 can be changed by the lighting control signal, usually, a digital value of 5% or less in the constant-current value table is not employed.
(Shift Until Checking Current)

According to the first embodiment, when a current of 15 mA is to be supplied to the LED series circuit 851 in which either 40 or 20 LEDs are connected (when the number-of-LEDs checking has not been completed yet, an LED series circuit 851 for which the current corresponding to the duty ratio of 5% is smaller), the duty ratio of the PWM signal to be output to the integration circuit 130 may be gradually increased within the range of 0% to 5% at a rate of 1%/5 msec. When the current is gradually increased within the range of 0% to 5% at a constant rate in this manner, the LED series circuit 851 can be lit naturally without posing any discomfort even before the current for performing number-of-LEDs checking immediately after the power supply is turned on reaches a current value of 15 mA.
(In Putting-Out or the Like)

In a state wherein the microcomputer IC51 drives the LED series circuit 851 to output a desired light-emission output (a target current value determined by the lighting control signal), assume that the microcomputer IC51 inputs a "putting-out signal" indicating putting out from the lighting controller 103, or assume that power supply from the commercial power supply 101 stops. In this case, the microcomputer IC51 may decrease the duty ratio of the PWM signal from the present target current value down to the target current value (second current) of 0% at a predetermined rate (1%/5 msec). The voltage generated by the integration circuit 130 based on the decreasing PWM signal is input to the power converter circuit 120. Thus, the current to the LED series circuit 851 decreases until the LED series circuit 851 is put out eventually. In this manner, when putting out the LED series circuit 851, the microcomputer IC51 decreases the PWM signal gradually toward 0% by changing the PWM signal at a constant rate (1%/5 msec), instead of changing the PWM signal from a value corresponding to the last target current value to a PWM signal corresponding to a current of 0% sharply. Then, the LED series circuit 851 can be put out without making people feel unpleasant.

The following settings are examples:

(1) the current range of 300 mA to 0 mA in the constant-current value table 151 for the LED series circuit 851 (40) having 40 LEDs;
(2) the current range of 400 mA to 0 mA in the constant-current value table 152 for the LED series circuit 851 (20) having 20 LEDs;
(3) the current value of 15 mA for performing number-of-LEDs checking immediately after the power supply is turned on;
(4) a number-of-LEDs checking voltage is 80 V;
(5) the lighting control signal having a duty ratio range of 100% to 5%;
(6) number-of-LEDs checking start time These values can be changed by the software of the microcomputer IC51. Even when the duty ratio of the PWM signal such as the lighting control signal is reversed, the same setting can be done (for example, when the lighting control signal has a duty ratio of 5%, the current on the constant-current value table is 300 mA).

The power supply circuit 100 according to the first embodiment described above automatically checks the numbers of LEDs of at least two types of LED series circuits 851 in which different numbers of LEDs are connected and which are driven by currents having different constant-current value ranges (if 40 LEDs are connected, the constant-current value range is 300 mA to 0 mA; if 20 LEDs are connected, the constant-current value range is 400 mA to 0 mA). Also, the power supply circuit 100 according to the first embodiment performs constant-current drive by a target current value determined based on a current value range corresponding to the number of LEDs connected (that is, the constant-current value table) and the lighting control signal (having a duty ratio range of 100% to 5%).

A conventional power supply circuit which performs constant-current drive is capable of constant-current drive even when the number or LEDs changes. If, however, the constant-current value serving as the reference (for example, a current for a lighting control signal having a duty ratio of 100%) is to be changed, the circuit constant need be changed, or a switch or the like need be physically altered or modified. In contrast to this, the power supply circuit 100 can drive LED series circuits 851 having different numbers of LEDs connected in series, without changing the circuit constant, or physically altering or modifying the switch or the like.

The power supply circuit 100 according to the first embodiment can be used as a constant-current drive power supply circuit for the LED series circuit 851 that can cope with a high power factor and harmonic component regulation, by means of the power factor correction of the power factor correction circuit 110 and the constant-current operation of the power converter circuit 120.

When the constant-current value table is stored in the control arithmetic circuit 112, the power supply circuit 100 of the first embodiment can finely adjust the target current value in a range of several 10 to several 100 levels with respect to a change in the duty ratio of the lighting control signal changes.

In the power supply circuit 100 according to the first embodiment, the voltage applied to the LED series circuit 851 is measured while a small checking current (a current corresponding to a drive current having a duty ratio of 5%, which is minimum among the plurality of LED series circuits 851) is being supplied to the LED series circuit 851, immediately after the commercial power supply is turned on, and after that the current is increased to the target current value. Hence, the LED can be lit to have a natural brightness, without making people feel uncomfortable.

With the power supply circuit 100 of the first embodiment, when the LED series circuit 851 is to be put out, the LED can be put out while decreasing the current gradually at a constant rate, instead of decreasing the current sharply from the last target current value. Thus, the LED can be put out to appear naturally without making people feel uncomfortable.

With the power supply circuit 100 of the first embodiment, when the target current value is to be changed by changing the lighting control signal while the LED series circuit 851 is ON, the control arithmetic circuit 112 does not change the current at a rate faster than a constant rate (1%/5 msec). Accordingly, the light-emission output of the LED does not change sharply. Even when the output from the lighting controller 103 is changed sharply, the light-emission output of the LED can be changed to appear naturally without making people feel uncomfortable.

In the power supply circuit 100 according to the first embodiment, the number-of-LEDs checking voltage, which is set considering the fluctuation in the forward voltage of the LED during the manufacture, a temperature change, and the current-voltage characteristics, is treated as the checking standard. Therefore, the number of LEDs can be checked without being influenced by the fluctuation in the manufacture or a temperature change. As a result, the plurality of LED series circuit 851 having different numbers of LEDs can be employed.

The power supply circuit 100 according to the first embodiment can cope with a plurality of LED series circuits 851 which have different numbers of LEDs and require different constant-current values. The power supply circuit 100 can check automatically the number of LEDs of each LED series circuit 851 connected, and can drive the LED series circuit 851 by a constant-current value that matches the number of LEDs in the LED series circuit 851.

The power supply circuit 100 according to the first embodiment can cope with a plurality of LED series circuits 851 which have different numbers of LEDs and require different constant-current values, and measures the voltage applied to the LED series circuit 851 connected. Thus, the power supply circuit 100 can check the number of LEDs of the predetermined LED series circuit 851, and can drive the LED series circuit 851 by a constant-current value that matches the number of LEDs connected.

The power supply circuit 100 according to the first embodiment can check automatically the numbers of LEDs connected to the plurality of LED series circuits 851, and can drive the LED series circuits 851 by constant-current values appropriate for the respective LED series circuits 851. Therefore, unlike in the conventional case, the power supply circuit 100 can be used as it is connected to the LED series circuit 851, without the need of discriminating each combination of the LED series circuit 851 and the power supply circuit 100, during assembly at the factory or at an installation site of the luminaire.

With the power supply circuit 100 according to the first embodiment, a plurality of LED series circuits 851 which have different numbers of LEDs and require different constant-current values can be constant-current driven by completely the same single constant-current drive power supply circuit.

The power supply circuit 100 according to the first embodiment can drive LED series circuits 851 having different numbers of LEDs with different constant-current values, only by rewriting the software of the control arithmetic circuit 112, without the need of changing a circuit constant or exchanging a component. Therefore, the specification of the power supply circuit can be altered easily.

The power supply circuit 100 according to the first embodiment can be used as a power supply circuit that constant-current drives a plurality of LED series circuits 851.

Numerous additional modifications and variations are possible in light of the above teachings. It is therefore to be understood that, within the scope of the appended claims, the disclosure of this patent specification may be practiced otherwise than as specifically described herein.

REFERENCE SIGNS LIST 100 power supply circuit, 101 commercial power supply, 102 rectifier circuit, 103 lighting controller, 110 power factor correction circuit, 111 voltage booster circuit, 112 control arithmetic circuit, 113 memory, 120 power converter circuit, 121 voltage dropping circuit, 122 current detection circuit, 123 voltage detection circuit, 130 integration circuit, 151, 152 constant-current value table, 800 luminaire, 802 light-emitting element, 851 LED series circuit, A45 error amplifier, C12 capacitor, C13 smoothing capacitor, C14 capacitor, DB11 diode bridge, D12 diode, D13 diode, IC41 control IC, IC42 control IC, IC51 microcomputer, L61 main winding, L62 auxiliary winding, L65 choke coil, Q71 switching element, Q72 switching element, R12, R13, R15, R16, R18, R19 voltage divider resistor, R14, R17 current detection resistor, T60 transformer, and T61 pulse transformer

The invention claimed is:

1. A light source lighting device comprising:
a constant-current supply part connected to a light source and subjected to drive control in order to supply a constant current of a substantially constant magnitude which matches the drive control, to the light source;
a light source application voltage detection part that detects a light source application voltage which is a voltage applied to the light source; and
a control part that checks a light source type of the light source connected to the constant-current supply part, based on the light source application voltage detected by the light source application voltage detection part, selects, from among drive information which describe constant-current value information corresponding to constant-current values to be supplied to the light source and which are held in advance for respective light source types, the drive information on the light source type indicated by a checking result of the light source type, and drive-controls the constant-current supply part based on the constant-current value information described on the drive information selected.

2. The light source lighting device according to claim 1,
wherein the constant-current supply part is connected to, as the light source, an LED light source in which a plurality of LEDs (Light-Emitting Diodes) are connected in series, and
wherein the control part checks the number of LEDs indicating the number of LEDs connected in series, of the LED light source, as the light source type of the light source, selects, from the drive information held in advance for respective numbers of LEDs, the drive information on the number of LEDs indicated by a checking result of the number of LEDs, and drive-controls the constant-current supply part based on the constant-current value information described on the drive information selected.

3. The light source lighting device according to claim 1,
wherein the drive information held by the control part in advance for the respective light source types describe the constant-current information that matches a lighting control factor, and
wherein the control part inputs a lighting control signal instructing a predetermined lighting control factor, from a lighting controller which transmits the lighting control signal, and after selection of the drive information, when inputting the lighting control signal from the lighting controller, the control part specifies the constant-current value information described on the drive information selected, from the lighting control factor indicated by the lighting control signal inputted, and drive-controls the constant-current supply part in accordance with the current-value information specified.

4. The light source lighting device according to claim 1,
wherein the light source lighting device is operated by a commercial power supply, and is started when the commercial power is turned on, and
wherein, when the commercial power supply is turned on, the control part executes drive control of causing the constant-current supply part to output a checking current indicating a constant current of a predetermined magnitude, and when the light source application voltage detection part detects the light source application voltage resulting from the checking current, the control part checks the light source type of the light source connected to the constant-current supply part, based on the light source application voltage detected, selects the drive information on the light source type indicated by a checking result of the light source type, from the drive information held in advance for the respective light source types, and drive-controls the constant-current supply part based on the constant-current value information described on the drive information selected.

5. A luminaire comprising a light source lighting device according to claim 1.

6. The light source lighting device according to claim 1, wherein, when the control part is to shift from a state of having the constant-current supply part output a first constant current to a state of having the constant-current supply part output a second constant current, the control part changes the state of outputting the first constant current to the state of outputting the second constant current gradually within a predetermined period.

7. The light source lighting device according to claim 4, wherein the control part executes drive control of causing the constant-current supply part to output the checking current by using, among the drive information held in advance for the respective light source types, the current value information corresponding to the smallest constant-current value.

* * * * *